July 25, 1944.   C. E. SLAUGHTER   2,354,485
COMPOSITE ARTICLE AND ELEMENT THEREFOR
Filed Nov. 2, 1942   2 Sheets-Sheet 2
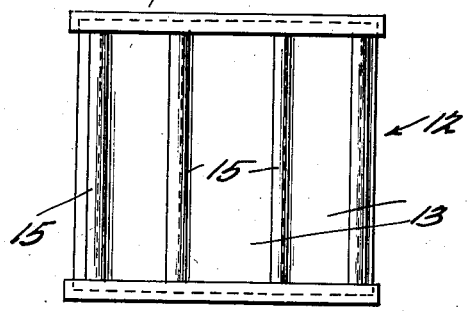
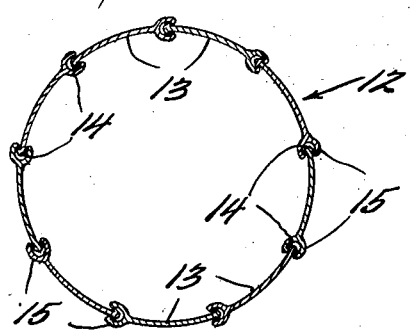
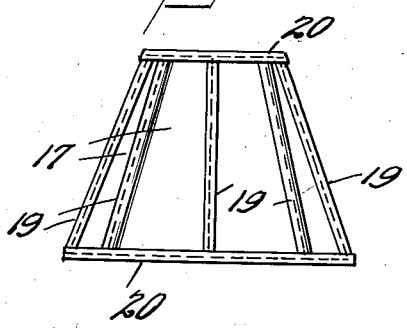
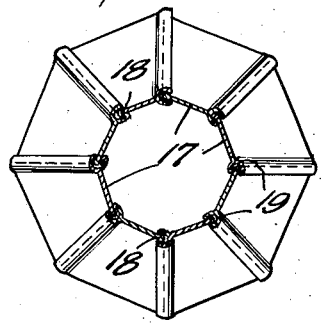
Inventor
Charles E. Slaughter,
By Sol Shapiro
Attorney

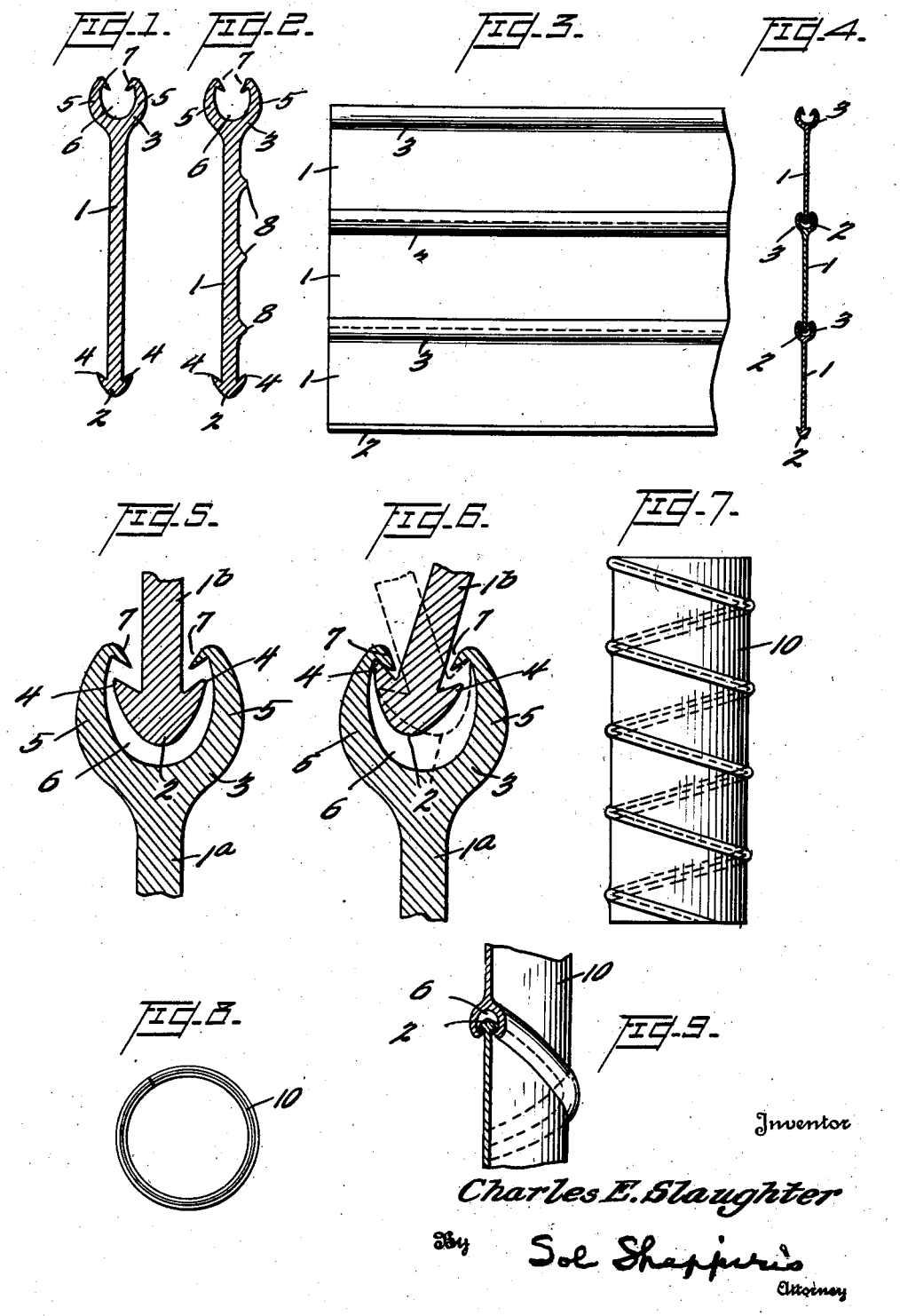

Patented July 25, 1944

2,354,485

UNITED STATES PATENT OFFICE

2,354,485

COMPOSITE ARTICLE AND ELEMENT THEREFOR

Charles E. Slaughter, New Canaan, Conn., assignor to Extruded Plastics, Inc., Norwalk, Conn., a corporation of Connecticut Application November 2, 1942, Serial No. 464,308

8 Claims. (Cl. 20—0.5)

This invention relates to composite articles built up from elements or sections and particularly to extruded plastic strips adapted to be utilized in the production of composite articles as well as to methods of producing such strips and their assembly into articles.

Among the objects of the present invention is the production of extruded plastic strips particularly of synthetic resinous material which adapt themselves to assembly in the formation of composite articles.

Other objects include the articles produced by assembly of such extruded synthetic strips.

Still further objects and advantages of the present invention will appear from the more detailed description set forth below, it being understood, however, that this more detailed description is given by way of illustration and explanation only, and not by way of limitation, since various changes therein may be made by those skilled in the art without departing from the scope and spirit of the present invention.

In connection with that more detailed description, there is shown in the accompanying drawings, in Figure 1, a cross-section through an extruded plastic strip produced in accordance with the present invention; in Figure 2, a modified form of extruded plastic strip of the present invention; in Figure 3, a composite sheet built up by assembly of a number of the strips shown in Figure 1; in Figure 4, a section through the composite article of Figure 3; in Figure 5, a cross-sectional fragmentary detail of the joint formed between assembled strips in accordance with the present invention; in Figure 6, an enlarged fragmentary cross-sectional detail further illustrating the joint formed between successive strips of the present invention; in Figure 7, a composite article in the form of a helical convolution produced from extruded plastic strips of the present invention; in Figure 8, an end view of the article of Figure 7; in Figure 9, an enlarged fragmentary cross-sectional detail on the line 9—9 of Figure 7; in Figure 10, a further form of composite articles produced in accordance with the present invention; in Figure 10a, a cross-section through an extruded edging strip; in Figure 11, a transverse section through the article of Figure 10; in Figure 12, a further form of composite article produced with the present invention; and in Figure 13, a plan view of the article of Figure 12.

In accordance with the present invention, extruded plastic strips particularly of synthetic resinous material are utilized in the production of composite articles therefrom, such articles being built up by the utilization of one or more of such extruded plastic strips, the strips being extruded in forms which adapt themselves to utilization in the production of such composite articles.

The extruded plastic strip desirably takes the form of a continuous extruded element which can be produced by extrusion in any length strip desired, the edges of such extruded strip being provided with means for enabling the strips to be assembled together or for enabling a single strip to be wound upon itself to produce a convolution, with adjacent edges of the convolution interconnected. For these purposes the extruded strip is provided on one edge with a barb or bead and on the other with a channel or groove adapted to receive the bead or barb of either the same or of another strip. The groove or channel portion is made large enough so that upon insertion of the bead or barb portion of a strip lateral movement of the barb or bead within the groove or channel is possible, provision being made not only against removal or displacement of the barb or bead from the channel or groove once the assembly has been made, but any force tending to separate the elements, actually serves to force the parts into closer union.

Illustrating the invention, an extruded continuous synthetic resinous or other plastic strip may be produced with a cross-section as shown in Figure 1, in which the body portion 1 carries the bead or barbed portion 2 along one edge thereof and the grooved or channel portion 3 along the other edge thereof. The bead 2 is desirably barb-shaped in cross-section having the extensions 4, 4 to produce the barb-shaped bead or head 2, each barb desirably being in the nature of a crane hook, for purposes hereinafter set forth. A channel or groved portion 3 is formed by wall portions 5, 5 extending from the body portion 1 and may be arcuate as illustrated in Figure 1, to produce the channel or groove 6 between such wall portions. The wall portions 5, 5 are desirably provided with projections adapted to engage against the barb-shaped portions 4, 4 of the bead 2 and for such purpose the wall portions may be formed with reentrant edges 7, 7 of desirably hook-shaped contour.

A continuous extruded synthetic resinous strip of the character shown in Figure 1 may be cut to the desired length and then assembled as shown in Figures 3 and 4 to produce a composite flat sheet by the insertion of successive barbs into corresponding grooves, the article in Figure 3 showing three such strip elements assembled together to form a relatively flat sheet, the elements of which, however, are capable of some movement with respect one to the other. Thus three strip portions 1, 1, 1 are assembled by the barbs 2, 2, being inserted into the respective channel portions 3, 3, within which they are retained by the reentrant edges or projections on the walls of the channel portions. Such composite sheets may be built up from extruded strips of the same or different colors or any combination of colors or patterns of materials may be utilized, particularly when such sheets are used for shades or lighting fixtures.

When used in connection with lighting fixtures, the body portions may be provided with facets for increasing the light diffusion or for other ornamental purposes or effects. As shown in Figure 2 the body portion 1 carries longitudinal ribs 8 to act as facets for the purposes just referred to.

A composite sheet produced from desired lengths of extruded strip material of the character referred to above has flexibility of movement of one strip with respect to the other because of the joint referred to. This is illustrated in detail in Figures 5 and 6. As there shown, for illustrative purposes, a strip 1a having the groove portion 3 is assembled in interlocking relation with the strip 1b having the barb portion 2, the latter being seated within the groove and being prevented from removal therefrom by the reentrant hook-shaped edges 7. Due to the relative sizes of the barb portion 2 and the groove within the channel portion 3, the parts are not rigidly locked together but lateral movement is possible between them since the barbed portion of the bead 2 may rest against the joint formed between the reentrant edge 7 and the adjacent wall portion 5 on which joint the strip 1b may fulcrum for movement as shown in Figure 6. Despite such permissible lateral movement of one strip with respect to the other, the reentrant edges 7, 7 prevent the withdrawal of the strip 1b from its interlocking connection with the strip 1a. It will be apparent that if any attempt is made to pull the elements apart, the hook-shaped edges 7, 7 will lock against the barbs 4, 4 so that any force exerted in this way will unite the elements more securely.

If after assembly of a number of strips to produce a composite article as set forth above, it is desired to eliminate any permissible lateral movement between the elements, the joint may be sealed against such movement by the application of a solvent for the particular plastic used, which solvent will serve to cement together the materials of the adjacent strips and upon evaporation of the solvent will leave a substantially rigid joint incapable of the movement referred to above. Or heat may be utilized for the same purpose where a thermoplastic material has been employed in the production of the plastic strip.

In the composite articles referred to above, assembly has been carried out by utilization of a series of strips and interlocking each strip with its successor in the manner described. However, it is possible to utilize a single strip for the production of an article where the strip has a structure of the character shown in Figure 1. For these purposes it is possible to insert the bead or barb of a strip into the groove or channel of the same strip and build up a convoluted body of the character shown in Figure 7. As illustrated there, a single strip 10 is helically convoluted on itself in the manner just described by the barb 2 of the strip 10 being held in position in the groove 6 of the same strip 10. Any length tube of this character can be produced from an extruded synthetic resinous strip depending on the length of strip utilized for such purpose. A cylindrical article as illustrated in Figures 7 and 8 may thus be readily produced from a single length of extruded synthetic resinous strip and such cylinder may be utilized for a variety of purposes as for the outside covering on thermos type bottles, or as a covering on rods, tubes, etc. Lamp stands may be produced from such a cylindrical article by application of the necessary base and lighting fixtures to such a cylinder. Or the ends of such a cylinder may be closed by caps and used as a container. Here again the strip utilized may be produced from any desired suitable plastic material in any color or effect known in the ornamentation of plastic materials to produce articles of very pleasing character and wide utility.

Instead of forming a substantially flat sheet by the assembly of a number of strips as illustrated in Figure 3, these strips may be utilized to produce a cylindrical article because of the lateral movement possible between successive strips as illustrated in Figures 5 and 6 and explained above. As shown in Figures 10 and 11, a number of lengths of such extruded strips are assembled with successive beaded and grooved portions in interlocking relation to produce a cylindrical body 12 made up of the individual strip elements 13, 13, having the beaded portions 14, 14, in interlocking relation with the grooved or channel portions 15, 15. Such a cylindrical article may be produced in any size desired either in diameter or in length. The edges of any of these articles may be covered by a covering such as 16 which may comprise merely a U-shaped extruded plastic strip as shown in Figure 10a either made of the same type of material as that of the strip 13 or of a dissimilar material and either of the same or a different color. Such a sealing element may also be utilized on flat sheets of the character of Figure 3, in which event it will be a straight continuous U-shaped element. Or it may be of annular character for covering the edge of a composite cylinder of the character illustrated in Figures 10 and 11.

Figures 12 and 13 illustrate a further type of composite article which can be produced in accordance with the present invention, the figures illustrating a lamp shade which is produced from extruded strips of limited length which are trapezoidal in shape, the side edges of such trapezoid carrying respectively the barb and groove portions illustrated above so that they may be successively assembled in a manner similar to that of Figures 3 and 10. Thus the trapezoidal sheets 17, 17 are provided with a beaded portion 18 on one edge thereof and a groove portion 19 on the other, the beaded and grooved portions being similar to the beaded and grooved portions along the edges of the strip of Figure 1. A number of such trapezoidal sheets may be assembled by insertion of the beaded portions within the grooved portions of the adjacent sheets to produce the composite lamp shade illustrated in Figures 12 and 13. Here again the edges of such composite articles may be sealed by means of the edging 20 in the form of a U-shaped strip analogous to that shown in Figure 10a, successive portions of such edging of a length equal to the corresponding portion of the trapezoid at that point being applied to each of the sheets, or a continuous length of U-shaped edging material may be shaped and applied to the finished composite article.

In all instances where edging strips are used to cover the edges of such composite articles as explained above, such edging strips may be sealed into position by means of cement or the application of plastic solvent.

The contour of the extruded plastic strip may be of any predetermined shape to suit any particular situation as long as the bead or barbed edge and grooved or channeled edge is provided for the purposes set forth. Such extruded strips may be produced to harmonize with particular surroundings both from the standpoint of their contour as well as color. Since they are made from synthetic plastics, the color may be chosen as desired. The strips may be flat, curved, ribbed or otherwise sectioned as desired.

The plastic composition employed may be opaque, translucent or transparent and the outer surfaces may be roughened, bevelled, ribbed or otherwise treated.

Synthetic resinous materials are particularly important for use in the production of such extruded strips and are exemplified by cellulose derivatives such as the esters, particularly cellulose acetate, cellulose acetate butyrate, and the ethers, such as ethyl cellulose; polymerized vinyl materials such as polymerized vinyl acetate, and other resinous compositions that desirably may be extruded in continuous lengths including vinyl resins or nylon resins.

Having thus set forth my invention, I claim:

1. A continuous strip having a bead along one edge and a groove along the other, said groove being of a size to receive the bead but large enough to permit lateral movement of the bead within the groove, the walls defining the groove having projections extending backwardly at an acute angle into and within the groove to retain the bead in the groove, the bead having a barb shaped projection adapted to interlock with the projections on the walls of the groove the barb shaped projection on the bead and the wall projections in the groove each having lateral edges defined by surfaces meeting at an acute angle whereby a bead of a strip may be inserted into a groove of a strip to form a composite article with the acute angular projections of the bead and groove adapted to engage together and to unite the strips more securely when force is applied in a transverse direction tending to pull them apart.

2. A continuous extruded plastic strip having a barb-shaped bead along one edge and a groove along the other, said groove being of a size to receive the bead but large enough to permit lateral movement of the bead within the groove, the walls defining the groove having acutely reentrant hook-shaped edges to retain the bead in the groove, the bead having a barb shaped projection adapted to interlock with the projections on the walls of the groove the barb shaped projection on the bead and the wall projections in the groove each having lateral edges defined by surfaces meeting at an acute angle whereby successive strips may be assembled together with alternate beads and grooves in interlocking relation to provide a composite sheet made up of a number of strip elements with the acute angular projections of the bead and groove adapted to engage together and to unite the strips more securely when force is applied in a transverse direction tending to pull them apart.

3. A continuous extruded plastic strip having a bead along one edge and a groove along the other, said groove being of a size to receive the bead but large enough to permit lateral movement of the bead within the groove, the walls defining the groove having inturned projecting edges extending backwardly at an acute angle into and within the groove spaced apart a lesser distance than the maximum width of the groove to retain the bead in the groove, the bead having a barb shaped projection adapted to interlock with the projections on the walls of the groove the barb shaped projection on the bead and the wall projections in the groove each having lateral edges defined by surfaces meeting at an acute angle whereby the bead of a strip may be inserted into the groove of a strip to form a composite article, with the acute angular projections of the bead and groove adapted to engage together and to unit the strips more securely when force is applied in a transverse direction tending to pull them apart.

4. A flexible sheet made up of a number of strip elements each strip element having a bead along one edge barbed-shaped in cross-section and a groove along the opposite edge oval-shaped in cross-section, the walls forming the groove having projections extending backwardly at an acute angle into and within the groove to interlock with the barb on the bead the barb shaped projection on the bead and the wall projections in the groove each having lateral edges defined by surfaces meeting at an acute angle with successive beads inserted into adjacent grooves with the acute angular projections of the bead and groove adapted to engage together and to unite the strips more securely when force is applied in a transverse direction tending to pull them apart.

5. A sheet made of a plurality of interlocking extruded plastic strips each having parallel barbed and grooved longitudinal edges, the walls forming the groove having projections extending backwardly at an acute angle into and within the groove to interlock with the barb on the bead the barb shaped projection on the bead and the wall projections in the groove each having lateral edges defined by surfaces meeting at an acute angle the barbed edge of one strip being held within the groove of the adjacent strip with the acute angular projections of the bead and groove adapted to engage together and to unite the strips more securely when force is applied in a transverse direction tending to pull them apart.

6. A continuous extruded synthetic resinous strip having a body portion and wall portions extending from one side of the body portion to form a channel between the wall portions, each wall portion having a flange projecting backwardly and inwardly at an acute angle toward the channel each flange having lateral edges defined by surfaces meeting at an acute angle.

7. In combination, a continuous extruded synthetic resinous strip having a body portion and wall portions extending from one side of the body portion to form a channel between the wall portions, each wall portion having a flange projecting backwardly and inwardly at an acute angle toward the channel each flange having lateral edges defined by surfaces meeting at an acute angle, and a continuous elongated insert carried by said strip, said insert having a body portion provided with a barb adapted to fit loosely within the channel of the strip but secured against removal therefrom by the flanges on the walls of the strip, the barb having lateral edges defined by surfaces meeting at an acute angle an edge of the barbed portion of the insert being adapted to engage against the joint formed between the flange and the adjacent wall of the strip on which joint the insert may fulcrum for movement, the insert having a stem extending from the body portion of the insert through the channel of the strip externally thereto with the acute angular edges of the bead and the acute angular flanges adapted to engage together and to unite the strips more securely when force is applied in a transverse direction tending to pull them apart.

8. In combination, a strip having a groove along an edge thereof the walls of the groove having projections extending backwardly at an acute angle into and within the groove, and a second strip having a bead along an edge thereof seated in the groove of the first strip, the bead having a barb shaped projection adapted to interlock with the projections on the walls of the groove, the barb shaped projection on the bead and the wall projections in the groove each having lateral edges defined by surfaces meeting at an acute angle whereby the acute angular projections of the bead and groove are adapted to engage together and to unite the strips more securely when force is applied in a transverse direction tending to pull them apart.

CHARLES E. SLAUGHTER.